United States Patent [19]

Lloyd et al.

[11] Patent Number: 5,645,487
[45] Date of Patent: Jul. 8, 1997

[54] CONSTANT VELOCITY RATIO UNIVERSAL JOINT OF THE TRIPODE TYPE

[75] Inventors: Richard Anthony Lloyd, Coventry; Stephen Charles Bartlett, Bridgnorth, both of England

[73] Assignee: GKN Automotive AG, Germany

[21] Appl. No.: 325,229

[22] PCT Filed: Apr. 30, 1993

[86] PCT No.: PCT/GB93/00914

§ 371 Date: Dec. 22, 1994

§ 102(e) Date: Dec. 22, 1994

[87] PCT Pub. No.: WO93/22577

PCT Pub. Date: Nov. 11, 1993

[30] Foreign Application Priority Data

May 1, 1992 [GB] United Kingdom ............... 9209451

[51] Int. Cl.$^6$ ............................................. F16D 3/205
[52] U.S. Cl. .................................... 464/111; 464/905
[58] Field of Search .............................. 464/111, 112, 464/120, 122, 123, 124, 137, 145

[56] References Cited

U.S. PATENT DOCUMENTS

| | | | |
|---|---|---|---|
| 3,125,870 | 3/1964 | Orain | 464/111 |
| 3,942,335 | 3/1976 | Orain | 464/124 X |
| 4,026,123 | 5/1977 | Durum | 464/111 |
| 4,033,145 | 7/1977 | Warner | 464/124 X |
| 4,036,032 | 7/1977 | Durum | 464/111 |
| 4,421,494 | 12/1983 | Futamura et al. | 464/111 |
| 5,135,438 | 8/1992 | Poulin et al. | 464/111 |

FOREIGN PATENT DOCUMENTS

| | | | |
|---|---|---|---|
| 2723721 | 11/1978 | Germany | 464/111 |
| 2848125 | 5/1980 | Germany | 464/111 |
| 60-266830 | 11/1986 | Japan | 464/111 |

Primary Examiner—Daniel P. Stodola
Assistant Examiner—Eileen A. Dunn
Attorney, Agent, or Firm—Kelly, Bauersfeld, Lowry & Kelley

[57] ABSTRACT

A constant velocity ratio universal joint of the tripode type includes an outer joint member with three tracks extending lengthwise of the joint member, and an inner joint member having three arms extending outwardly into the tracks of the outer joint member. Each arm carries a respective roller having an external surface which engages opposed side portions of the associated track. Each roller is able to tilt within its associated track and move therealong so that the inner and outer joint members are able to move axially relative to one another and undergo relative articulation. In the invention 1) the tracks in the outer joint member, in respect of their alignment relative to a datum comprising the axis of rotation of the outer joint member, and 2) the arms of the inner joint member, in respect of their alignment relative to a datum comprising a plane perpendicular to the axis of rotation of the inner joint member, at least the tracks in the outer joint member are so inclined relative to the respective datum as substantially to eliminate the third order transmission error from the joint.

8 Claims, 4 Drawing Sheets

CONSTANT VELOCITY RATIO UNIVERSAL JOINT OF THE TRIPODE TYPE

DESCRIPTION OF INVENTION

This invention relates to constant velocity ratio (homokinetic) universal joints of the tripode type, such a joint comprising an outer joint member having a rotational axis and three tracks equally circumferentially spaced about its rotational axis and extending lengthwise of the joint member; and an inner joint member having a rotational axis and three arms equally circumferentially spaced about its rotational axis and extending outwardly from the inner joint member into the tracks of the outer joint member, each arm carrying a respective roller having an external surface which engages opposed side portions of the associated track, each roller being able to tilt within its associated track and move therealong so that the inner and outer joint members are able to move axially relative to one another and undergo relative articulation. Such a joint will hereafter be referred to as a joint of the kind specified.

Tripode-type joints of the kind specified are widely used in motor vehicle drive lines, for example as the inboard universal joints of drive shafts extending laterally to drivable wheels of a vehicle. When used in motor vehicles, particularly passenger cars, the transmission characteristics of universal joints in terms of not causing any vibrations in the vehicle drive line are of great importance, to reduce noise, vibration and harshness detectable by persons travelling in the vehicle.

In a conventional tripode joint of the kind specified, the tracks in the outer joint member extend parallel to the rotational axis of such joint member. The arms of the inner joint member are perpendicular to the rotational axis of the inner joint member. There have been proposals for tripode joints in which the tracks and arms are at other orientations, for example U.S. Pat. No. 3,990,267, shows a tripode joint wherein the tracks of one joint member are skewed relative to the rotational axis thereof, for the purpose of generating an axial force when the joint transmits torque. It has been proposed, in JP Utility Model publication 63-115927, that the arms of the inner joint member should be inclined at an angle other than 90° to the rotational axis of the joint member, but this does not eliminate the transmission error described hereafter.

Although commonly referred to as a constant velocity ratio (homokinetic) universal joint, the conventional tripode joint of the kind specified only behaves as a truly constant velocity ratio joint if it is installed in such a way that rotation of the joint when articulated does not cause a change in the inclination of the rotational axis of the inner joint member relative to the axis of the outer joint member. If not installed thus, and one joint member is rotated at a constant angular velocity, when the joint is articulated, the angular velocity of the other joint member will cyclically decrease and increase, although the mean angular velocity of both joint members is, of course, the same. This deviation of the joint from true constant velocity characteristics, referred to herein as transmission error, is predominantly third order, being a sinusoidal variation with a frequency of three times the rate of rotation of the joint. There are other orders of transmission error, but Fourier analysis shows that, for a geometrically perfect joint having no other geometric distortions, the third order component represents 99.8% of the RMS value of all transmission errors. The transmission error arises from the orbital motion which the centre of the inner joint member is caused to undergo if the rotational axis of the outer joint member is held fixed, and if the opposite end of a shaft connected to the inner joint member is constrained to rotate about a fixed point the inclination of such shaft must change. If such shaft were (theoretically) infinitely long the change in inclination would be zero, or a change in shaft inclination can be avoided if a tripode-type joint is used at the other end of the shaft, providing the arms of the inner joint members of the two joints are in phased relationship with one another and the articulation angles of the two joints are equal. Although the shaft connecting the two joints is still subject to an orbiting motion about its nominal axis it remains parallel to such axis and its angular velocity does not fluctuate.

The transmission error above described is believed to be a significant factor in the overall characteristics of a tripode-type joint, in terms of excitation of driveline vibrations, and accordingly it is an object of the present invention to reduce such error and the disadvantageous consequences thereof. The absence of speed fluctuations would also be beneficial in specialised applications such as instrument drives or precision mechanisms or in high rotary inertia drives.

SUMMARY OF THE INVENTION

According to the present invention, we provide a constant velocity ratio universal joint of the tripode type, comprising an outer joint member having a rotational axis and three tracks equally circumferentially spaced about its rotational axis and extending lengthwise of the joint member; and an inner joint member having a rotational axis and three arms equally circumferentially spaced about its rotational axis and extending outwardly from the inner joint member into the tracks of the outer joint member, each arm carrying a respective roller having an external surface which engages opposed side portions of the associated track, each roller being able to tilt within its associated track and move therealong so that the inner and outer joint members are able to move axially relative to one another and undergo relative articulation, wherein, of 1. the tracks in the outer joint member, in respect of their alignment relative to a datum comprising the axis of rotation of the outer joint member, and
2. the arms of the inner joint member, in respect of their alignment relative to a datum comprising a plane perpendicular to the axis of rotation of the inner joint member, at least the tracks in the outer joint member are so inclined relative to the respective datum as substantially to eliminate the third order transmission error from the joint.

As mentioned above, in a conventional tripode-type universal joint of the kind specified, the tracks in the outer joint member extend parallel to the rotational axis of such joint member. The arms of the inner joint member are perpendicular to the rotational axis of the inner joint member. It has been found that the third order transmission error, in a joint according to the invention, can be eliminated by providing that the tracks in the outer joint member are at an orientation other than parallel to the rotational axis of the joint member, or by providing that the tracks in the outer joint member are at an orientation other than parallel to the rotational axis of the joint member and the arms of the inner joint member are at an orientation other than perpendicular to the rotational axis of the joint member.

The usual configuration of the inner and outer joint members of a tripode joint of the kind to which the present invention relates is that the outer joint member is generally in the form of a hollow component closed at one end, such end being provided with a stub shaft, a drive flange or other means whereby torque may be transmitted to the outer joint member. The inner joint member is adapted for connection to a shaft element which extends from the joint at its end opposite the closed end of the outer joint member.

In one embodiment of joint according to the invention, the arms of the inner joint member may be arranged as in a conventional joint, i.e. perpendicular to the rotational axis of the inner joint member, while the tracks in the outer joint member are inclined so as to diverge from one another as they extend from the closed end of the outer joint member to the open end thereof, the centre lines of the tracks lying in respective planes which also contain the rotational axis of the outer joint member, and being inclined at an angle of 3° to 4° to such axis.

For a typical joint, the optimum angle has been found to be about 3.8°. For a theoretical complete elimination of the third order transmission error, the angle of inclination of each track relative to the rotational axis of the outer joint member may be determined by the expression $0.9998 \arctan (r/L)$ where r is the pitch circle radius of the tracks at the normal axial position of the inner joint member within the outer joint member, and L is the length of the shaft connected to the inner joint member.

In an alternative embodiment of joint according to the invention, the tracks in the outer joint member can be inclined relative to the rotational axis of the outer joint member in the opposite sense to that referred to above, i.e. the tracks can converge as they extend from the closed end of the outer joint member to the open end from which a shaft element connected to inner joint member extends. At the same time, the arms of the inner joint member are inclined relative to the conventional orientation perpendicular to the rotational axis of the inner joint member, such inclination being in the same sense as the inclination of the tracks relative to the rotational axis of the outer joint member, i.e. the arms being inclined towards the opposite end of a shaft element connected to the inner joint member.

In this case, the inclination of each track relative to the rotational axis of the outer joint member, and the inclination of each arm relative to the perpendicular to the rotational axis of the inner joint member, may be in the range 3° to 4°, preferably approximately 3.8°.

The expression for the inclination of the tracks and arms is given by the expression $0.9949 \arctan (r/L)$, r and L being as defined above.

If the tracks in the outer joint member are inclined, it will be appreciated that the pitch circle radius of the tracks varies along the length of the outer joint member. In accordance with either of the expressions above set forth for calculating track inclination, it will be understood that theoretically the configuration of the tracks would be a shallow curve, the inclination of the tracks varying along their length. The theoretical form of the tracks is given by the approximation $$r = r_o e^{(x/L)}$$

where r=pitch circle radius of track
$r_o$=pitch circle radius at axial datum position
x=axial displacement from the datum position
L=length of shaft connected to inner joint member Such curved tracks, of varying inclination along their length are difficult to manufacture, and in practice substantial elimination of the third order transmission error can be achieved if the tracks are straight, their inclination being determined by the pitch circle radius at the normal operating position of the inner joint member axially of the outer joint member.

The surprising aspect of the findings according to the invention is that they reduce the transmission error not only at one angle of joint articulation but over the whole range of angles within which such joints are required to articulate.

BRIEF DESCRIPTION OF THE DRAWINGS

The invention will now be described by way of example with reference to the accompanying drawings, of which.

DETAILED DESCRIPTION OF THE PREFERRED EMBODIMENTS

Figure 1:
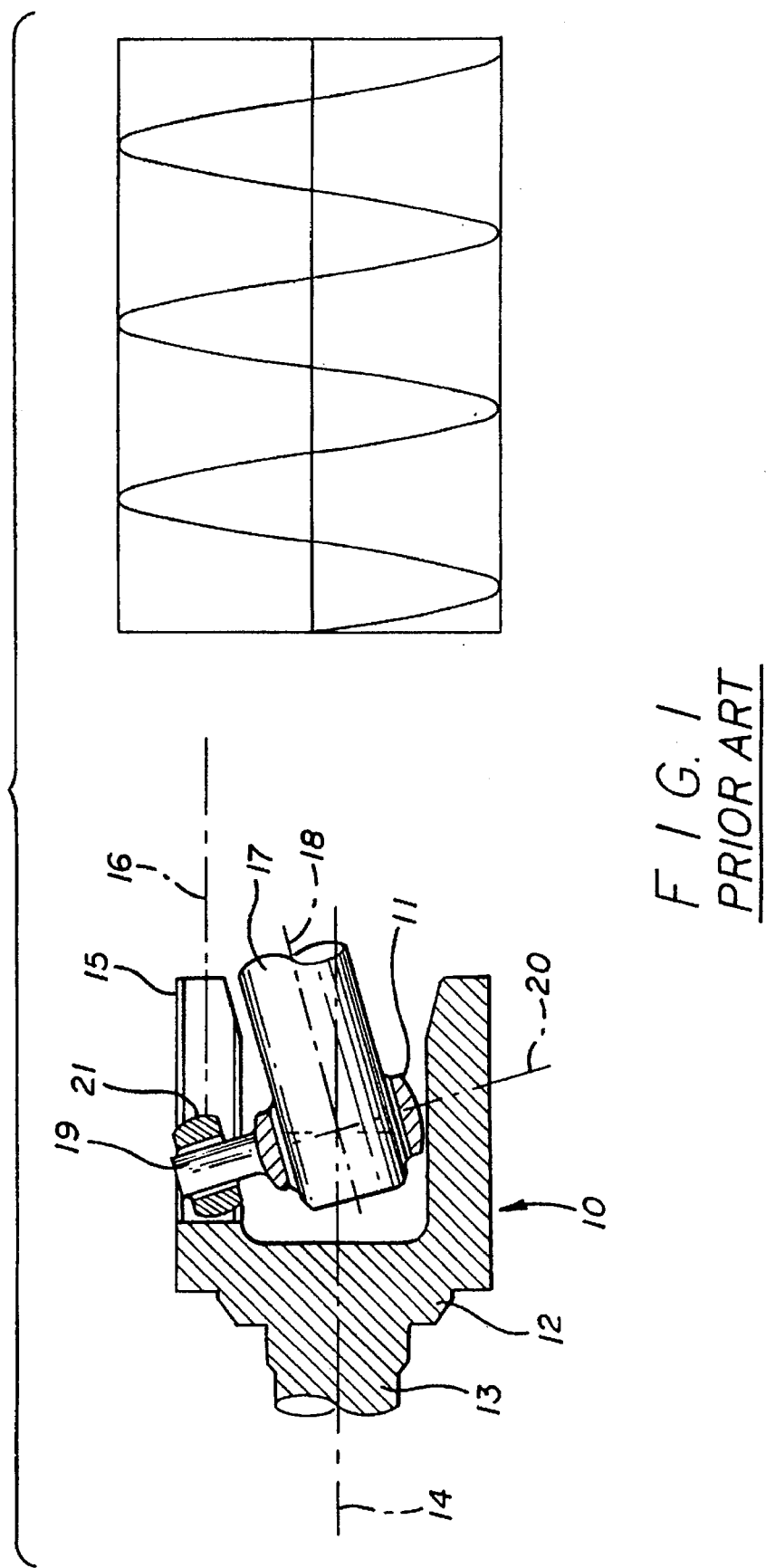
FIG. 1 is a diagrammatic section through a conventional tripode joint, and the accompanying graph shows the transmission error associated therewith.

Referring firstly to FIG. 1 of the drawings, the prior art tripode type of universal joint there illustrated comprises an outer joint member indicated generally at 10 and an inner joint member indicated generally at 11. The outer joint member is generally in the form of a hollow component, closed at one end 12 from which end a stub shaft 13 extends for torque transmitting connection of the outer joint member to another component in, for example, a vehicle driveline. The rotational axis of the outer joint member is indicated at 14. From the closed end 12 of the outer joint member there extend three tracks 15, equally circumferentially spaced about the axis of rotation 14 of the joint member. Each track comprises opposed surfaces which are generally in the form of parts of a cylindrical or substantially cylindrical surface. The centre lines of the tracks, as indicated at 16, and which are the central longitudinal axes of the cylinders of which the tracks surfaces form part, are parallel to the rotational axis 14 of the outer joint member. In the illustrated joint the tracks 15 are open towards the external circumference of the outer joint member; in some designs of tripode joint the tracks are not thus open and the outer joint member is in the form of a cup with an unbroken external circumferential surface.

The inner joint member 11 is an annular component, having torque transmitting engagement with a shaft element 17 extending therefrom out of the open end of the outer joint member 10, the rotational axis of the inner joint member and shaft 17 being indicated at 18. Three arms, one of which is shown at 19, extend outwardly from the inner joint member into the tracks 15 in the outer joint member, such arms having respective axes as indicated at 20 for the arm 19, which axes lie in a plane perpendicular to the rotational axis 18 of the inner joint member. Each arm 19 carries a respective roller as seen at 21, which is able to rotate about the arm and move lengthwise of the arm, i.e. axially with respect to the arm axis 20. Each roller 21 has a part-spherical external surface, which enables the roller to tilt within the track 15 in which it engages. This condition is illustrated in FIG. 1, in which the joint is in the articulated condition with the rotational axes 14, 18 of the outer and inner joint members inclined to one another.

As hereinbefore described, a transmission error is associated with a conventional tripode joint as above described. If one joint member is rotated at a constant angular velocity when the joint is articulated, the angular velocity of the other joint member will cyclically decrease and increase. This transmission error, which is predominantly a third order error, is a sinusoidal variation with a frequency of three times the rate of rotation of the joint, as illustrated in the diagram to the right of the joint shown in FIG. 1.

Figure 2:
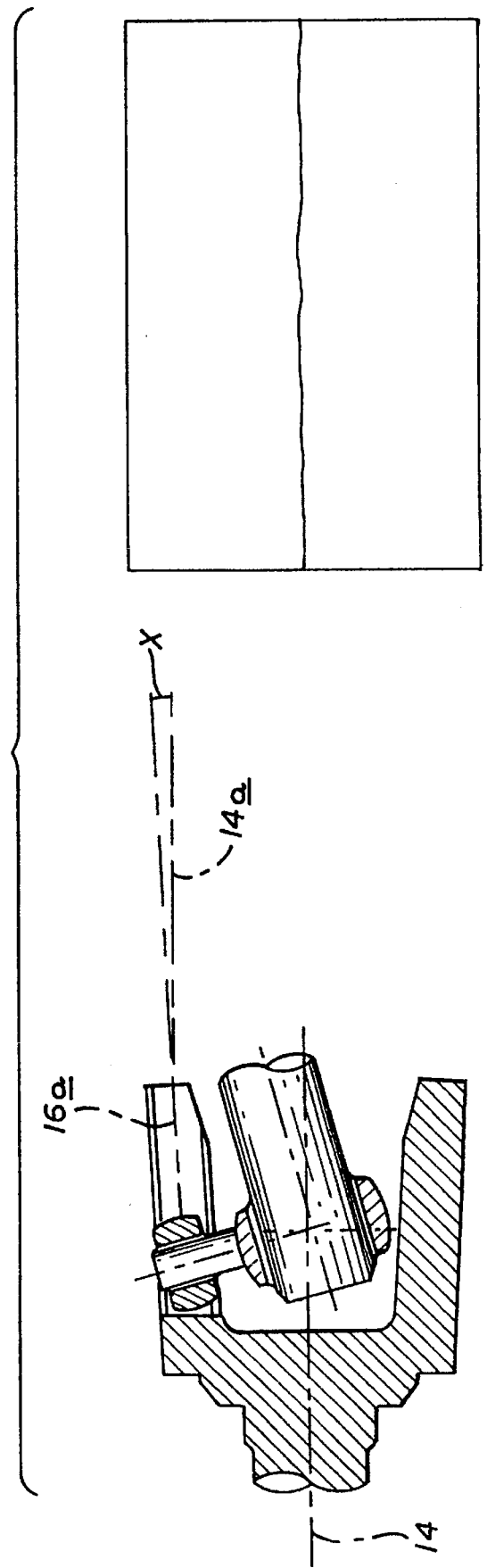
FIG. 2 is a view as FIG. 1, showing a first embodiment of joint according to the present invention.

FIG. 2 shows a first embodiment of universal joint according to the present invention. The basic structure of the joint, comprising an outer joint member and inner joint member and associated parts is the same as that described above and will not therefore be described again. The joint differs from the joint of FIG. 1, however, in that the centre line of each track of the outer joint member is inclined to the rotational axis of the outer joint member instead of being parallel thereto. In FIG. 2, the centre line of the illustrated track is indicated at 16a, and this centre line is inclined at an angle X to a line 14a parallel to the rotational axis 14 of the outer joint member. The centre line 16a lies in a plane which also contains the axis 14, and the inclination of each track is such that the tracks diverge from one another as they extend from the closed end to the open end of the outer joint member.

By appropriate selection of the angle X, the third order transmission error in the joint can be reduced to zero as shown diagrammatically in FIG. 2. For the type of joint typically used in vehicle drivelines, the angle X is between 3° and 4°, preferably approximately 3.8°.

Figure 3:
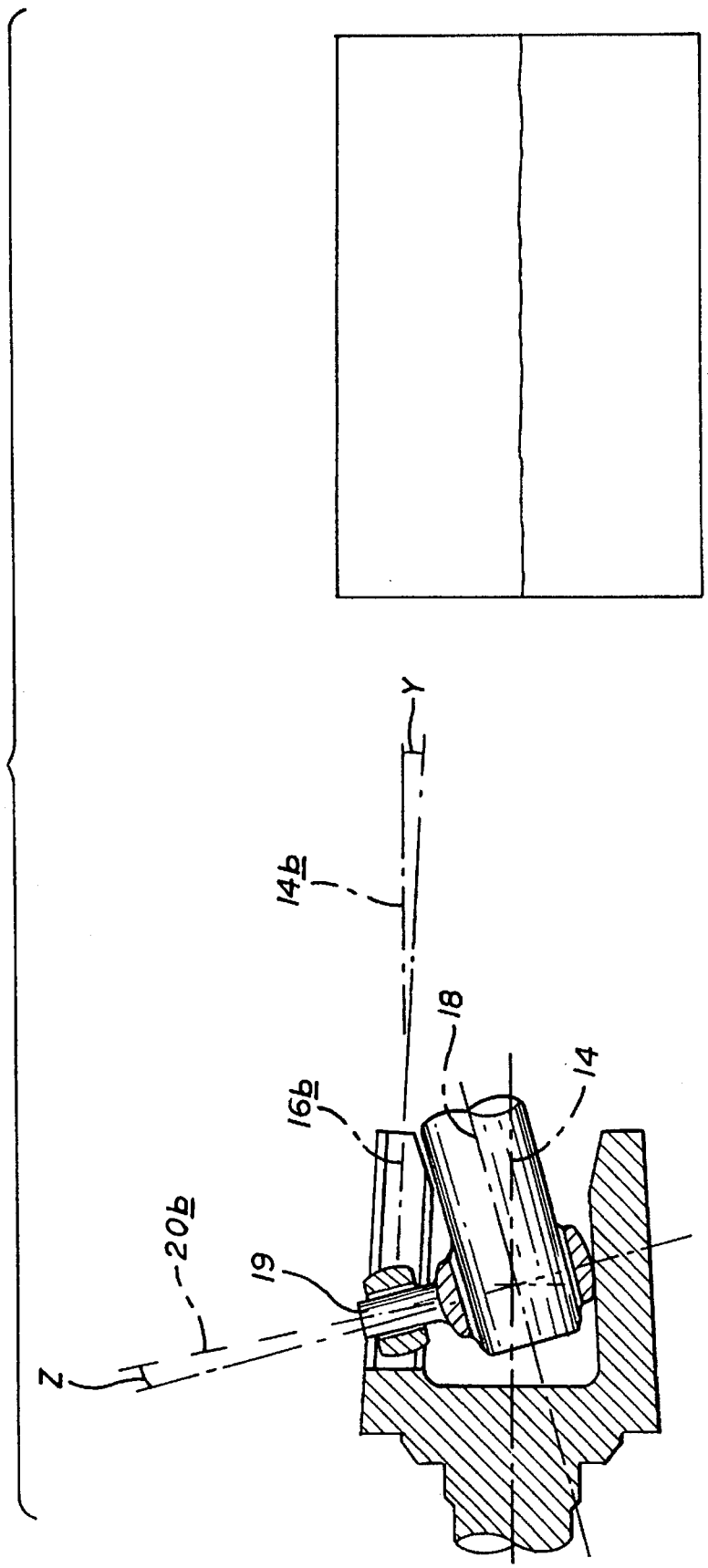
FIG. 3 is a further view showing another embodiment of joint according to the present invention.

FIG. 3 shows a further embodiment of joint according to the invention, which again is the same in respect of its general structure as the joint of FIG. 1. In this embodiment, both the centre lines of the tracks in the outer joint member, and the arms of the inner joint member are inclined relative to, respectively, the rotational axis of the outer joint member and the plane perpendicular to the rotational axis of the inner joint member.

FIG. 3 shows one of the tracks in the outer joint member arranged with its centre line 16b inclined at an angle Y to a line 14b parallel to the rotational axis 14 of the outer joint member. The tracks in the embodiment of FIG. 3 are inclined in the opposite sense to the inclination thereof in the embodiment of FIG. 2, i.e. in FIG. 3 the tracks converge as they extend from the closed end of the outer joint member to the open end thereof.

In FIG. 3, the axis 20b of the illustrated arm 19 of the inner joint member is inclined at an angle Z to the plane perpendicular to the axis of rotation 18 of the inner joint member. The arms of the inner joint member are inclined in the same sense as the tracks in the outer joint member, i.e. the arms are melted towards the end of the shaft element 17 remote from that which is connected to the inner joint member. The axes of the arms intersect the axis of the inner joint member.

The angle Y is substantially equal to the angle Z, and this angle also is preferably, for typical joints, in the range 3° to 4°, preferably 3.8°.

Figure 4:
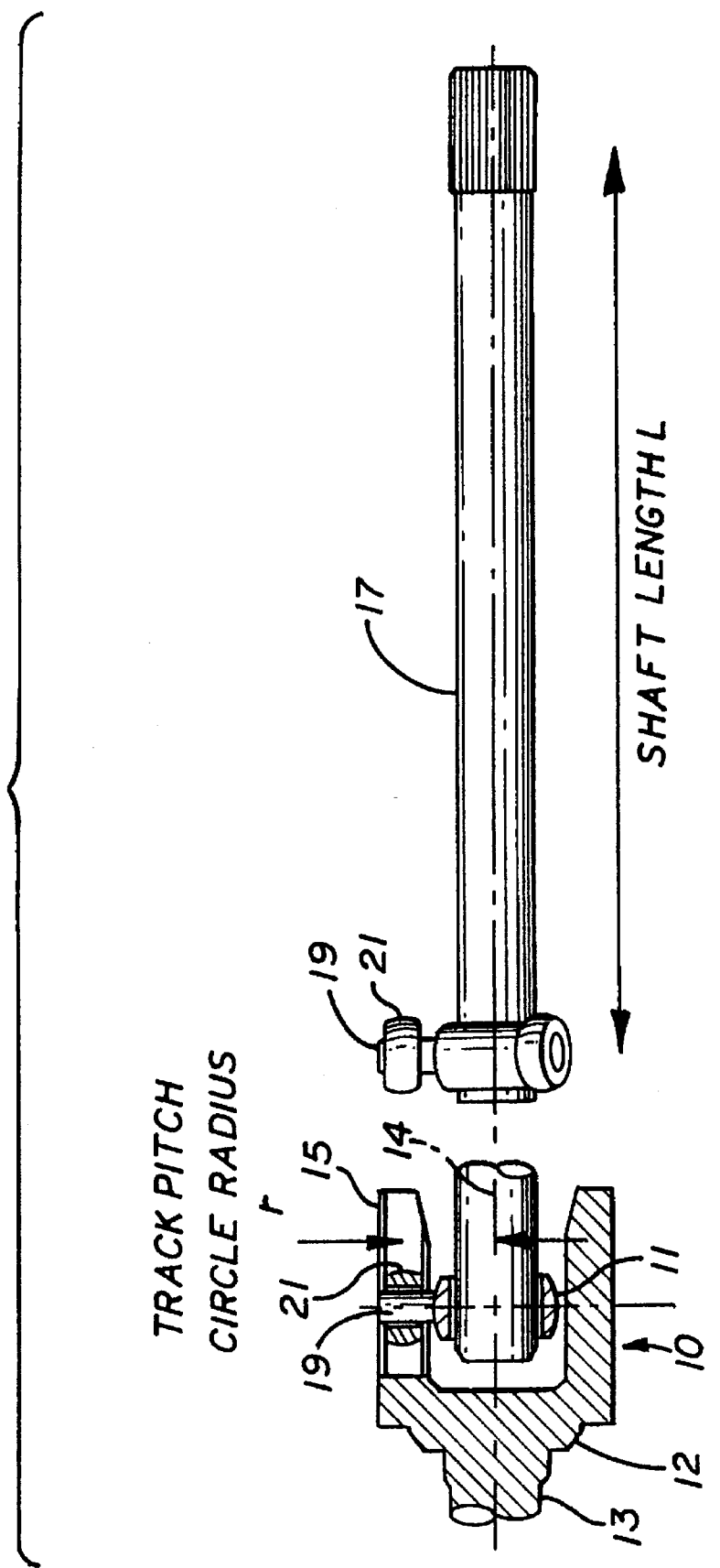
FIG. 4 is a view showing the dimensions applicable to the calculation of track and arm inclination in joints according to the invention.

FIG. 4 of the drawings shows how the angle X in the embodiment of FIG. 2 or the angles Y and Z in the embodiment of FIG. 3 may be calculated. Exact values of these angles depend on the pitch circle radius of the tracks in the outer joint member, i.e. the distance from the rotational axis of the outer joint member to the centre lines of the tracks, and the overall length of the shaft element connected to the inner joint member. In each case, the angle X, Y, or Z is approximately equal to arctan (r/L). More precisely, the angle X in the embodiment of FIG. 2 equals 0.9998 arctan (r/L) whilst the angles Y and Z in the embodiment of FIG. 3 each equals 0.9949 arctan (r/L).

It will be appreciated that since, if the tracks are inclined, r varies, the angle of inclination of the tracks will theoretically vary along the length of the tracks. Theoretically the configuration of the tracks is a shallow curve so that the pitch circle radius of the track varies in accordance with the expression $r \approx r_o . e^{(x/L)}$. In practice, however, substantial elimination of the third order transmission error can be achieved if the tracks are straight, their inclination being determined in accordance with the pitch circle radius thereof at the normal operating position of the inner joint member axially of the outer joint member. In typical use of a joint in a motor vehicle drive line, most of the axial displacement of the inner joint member from its normal operating position is of small magnitude, with displacements of greater magnitude only rarely arising.

The features disclosed in the foregoing description or the following claims or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

We claim:

1. A constant velocity ratio universal joint of the tripode type, comprising:

an outer joint member having a rotational axis and three tracks, each track having opposed side portions and a center line and said center lines of the tracks being equally circumferentially spaced about said rotational axis of the outer joint member and extending lengthwise of the outer joint member in respective planes which also contain said rotational axis of the outer joint member; a point in each said track center line being disposed at a pitch circle radius r relative to said rotational axis of the outer joint member; said outer joint member having a closed end and an open end;

an inner joint member having a rotational axis and three arms equally circumferentially spaced about said rotational axis of the inner joint member and extending perpendicularly to said rotational axis of the inner joint member outwardly of the inner joint member into respective said tracks of the outer joint member;

a respective roller carried by each arm and having an external surface which engages opposed side portions of the respective said track, each roller being able to tilt within its respective track and move there along so that the inner and outer joint members are able to move axially relative to one another and undergo relative articulation;

a shaft connected to the inner joint member and extending therefrom along said rotational axis thereof out of said open end of the outer joint member, said shaft having a length L;

wherein the center lines of the tracks are inclined to said rotational axis of the outer joint member so as to diverge therefrom as they extend from said closed end of the outer joint member to said open end thereof, at an angle approximately equal to arctan (r/L), whereby third order transmission error is substantially eliminated form the joint.

2. A joint according to claim 1, wherein said inclination of at least the tracks is in the range 3° to 4°.

3. A joint according to claim 2, wherein said inclination is approximately 3.8°.

4. A joint according to claim 1, wherein said angle equals 0.9998 arctan (r/L).

5. A constant velocity ratio universal joint of the tripode type, comprising:

an outer joint member having a rotational axis and three tracks, each track having opposed side portions and a center line and said center lines of the tracks being equally circumferentially spaced about said rotational axis of the outer joint member and extending lengthwise of the outer joint member in respective planes which also contain said rotational axis of the outer joint member; a point in each said track center line being disposed at a pitch circle radius r relative to said rotational axis of the outer joint member; said outer joint member having a closed end and an open end;

an inner joint member having a rotational axis and three arms equally circumferentially spaced about said rotational axis of the inner joint member and extending outwardly of the inner joint member into respective said tracks of the outer joint member;

a respective roller carried by each arm and having an external surface which engages opposed side portions of the respective said track, each roller being able to tilt within its respective track and move there along so that the inner and outer joint members are able to move axially relative to one another and undergo relative articulation;

a shaft connected to the inner joint member and extending therefrom along said rotational axis thereof out of said open end of the outer joint member, said shaft having a length L;

the center lines of the tracks in the outer joint member being inclined to said rotational axis of the outer joint member so as to converge towards one another as they extend from the closed end of the outer joint member to the open end thereof;

the arms of the inner joint member being inclined relative to a plane perpendicular to the rotational axis of the inner joint member, such inclination being towards said open end of the outer joint member;

each said inclination of the arms and the tracks being at an angle approximately equal to arctan (r/L), whereby third order transmission error is substantially eliminated from the joint.

6. A joint according to claim 5, wherein said inclination of at least the tracks is in the range 3° to 4°.

7. A joint according to claim 6, wherein said inclination is approximately 3.8°.

8. A joint according to claim 5, wherein said angle equals 0.9949 arctan (r/L).

* * * * *